US007564969B2

(12) United States Patent
Cole (10) Patent No.: US 7,564,969 B2
(45) Date of Patent: Jul. 21, 2009

(54) METHODOLOGY, SYSTEM AND COMPUTER READABLE MEDIUM FOR DETECTING FILE ENCRYPTION

(75) Inventor: Eric B. Cole, Leesburg, VA (US)

(73) Assignee: Sytex, Inc., Doylestown, PA (US)

( * ) Notice: Subject to any disclaimer, the term of this patent is extended or adjusted under 35 U.S.C. 154(b) by 836 days.

(21) Appl. No.: 10/405,996

(22) Filed: Apr. 1, 2003

(65) Prior Publication Data
US 2004/0196970 A1    Oct. 7, 2004

(51) Int. Cl.
H04L 9/00    (2006.01)
(52) U.S. Cl. ............................................. 380/1
(58) Field of Classification Search ........................ 380/1
See application file for complete search history.

(56) References Cited

U.S. PATENT DOCUMENTS

| 4,710,957 | A | * | 12/1987 | Bocci et al. ................... 380/42 |
| 5,235,644 | A | * | 8/1993 | Gupta et al. ................. 713/161 |
| 5,414,833 | A | * | 5/1995 | Hershey et al. ............... 726/22 |
| 5,541,997 | A | * | 7/1996 | Pappas et al. ............... 380/271 |
| 5,600,726 | A | * | 2/1997 | Morgan et al. .............. 713/164 |
| 5,751,814 | A | | 5/1998 | Kafri |
| 6,249,866 | B1 | | 6/2001 | Brundrett et al. |
| 6,393,568 | B1 | * | 5/2002 | Ranger et al. .............. 713/188 |
| 2002/0065869 | A1 | * | 5/2002 | Calder et al. ................ 709/201 |
| 2002/0129140 | A1 | * | 9/2002 | Peled et al. ................. 709/224 |
| 2003/0126449 | A1 | * | 7/2003 | Kelly et al. .................. 713/187 |
| 2003/0198386 | A1 | * | 10/2003 | Luo ............................ 382/199 |

OTHER PUBLICATIONS

Frank A. Feldman, A New Spectral Test for Nonrandomness and the DES, Mar. 1990, IEEE Transactions on Software Engineering, vol. 16, No. 3, pp. 261-267.*
"Chi-Square" obtained from www.mste.uiuc.edu/patel/chisquare/chisquare.html.
"Chi Square Tutorial" obtained from www.georgetown.edu/faculty/ballc/webtools/web_chi_tut.html.

* cited by examiner

*Primary Examiner*—Emmanuel L Moise
*Assistant Examiner*—David J Pearson
(74) *Attorney, Agent, or Firm*—Buchana Ingersoll & Rooney PC (57) ABSTRACT

A method, computer readable medium and system for determining whether a data stream is in cyphertext format statistically analyzes the data stream to compute a resultant value indicative of a level of uniformity for a frequency distribution of the data stream's byte values. When applied to one or more files an average byte value may be computed for the data stream and a chi-square statistical analysis of the data bytes performed, with the resultant value computed based on the chi-square value. The resultant is then compared to a predetermined threshold value to determine whether the file has been encrypted. The computer-readable medium has executable instructions for reading the data stream portions of files to compute a resultant value for each file and control an output device to display appropriate output. The encryption detection system comprises a storage device, an output device and a processor programmed in accordance with the foregoing.

27 Claims, 6 Drawing Sheets

| Name | Size | Type |
|---|---|---|
| Find.exe | 50KB | Application |
| testexe.doc | 131KB | Microsoft Word Document |
| testexe.exe | 131KB | Application |
| testdoc.doc | 36KB | Microsoft Word Document |
| testxls.xls | 59KB | Microsoft Excel Worksheet |
| testpgp.exe | 113KB | Application |
| testpgp.pgp | 113KB | PGP Encrypted File |
| testzip.txt | 2KB | Text Document |
| testzip.zip | 2KB | WinZip File |

Fig.5  ⟵ 502

```
Command Prompt

C:\>find -r -s c:\testdir
C:\>testdir\testpgp.exe may contain encrypted data.
C:\>testdir\testpgp.pgp may contain encrypted data.

Tested           9 files in       1 directories
  Encrypted files:        2
  Small files:            0
  Compressed files:       2
  Image files:            0
  Warnings                0

```
Command Prompt

C:\>find -v -s c:\testdir
C:\>testdir\testpgp.exe may contain encrypted data.   -  -0.0889439
C:\>testdir\testpgp.pgp may contain encrypted data.   -  -0.0889439

Tested           9 files in       1 directories
  Encrypted files:        2
  Small files:            0
  Compressed files:       2
  Image files:            0
  Warnings                0

```
Command Prompt

C:\>find -s  c:\testdir2
C:\testdir2\Sample.doc    file   Too small!  size = 162
C:\testdir2\Sample.txt    file   Too small!  size = 171

Tested              4 files in        1  directories
  Encrypted files:                    0
  Small files:                        2
  Compressed files:                   0
  Image files:                        0
  Warnings                            0

```
Command Prompt

C:\>find -r -s  c:\testdir2
C:\testdir2\Sample.doc         file    Too small! size = 162
C:\testdir2\Sample.txt         file    Too small! size = 171
C:\testdir\2\Subfolder\Sample.txt   file   Too smalI  size = 171

Tested              6 files in        2  directories
  Encrypted files:                    0
  Small files:                        3
  Compressed files:                   0
  Image files:                        0
  Warnings                            0

METHODOLOGY, SYSTEM AND COMPUTER READABLE MEDIUM FOR DETECTING FILE ENCRYPTION

FIELD OF THE INVENTION

The present invention broadly relates to the field of cryptography, and particularly the detection of encrypted data. The present invention more specifically concerns systems, methodologies and computer readable media for use ascertaining whether the data portion associated with a file has been converted from a plaintext format into cyphertext by an encryption algorithm.

BACKGROUND OF THE INVENTION

Date transmitted through a computer network, particularly a public network such as the Internet, is inherently vulnerable to pirating by illegitimate users. Misappropriation of data can occur in a variety of ways, such as through physically absconding with data storage media or surreptitiously gaining unauthorized access to the data over a network interface, i.e., hacking. As society continues to exhibit an ever-increasing reliance on computer systems, the protection of sensitive data will always be an important consideration.

A very common approach for protecting sensitive data is to encrypt the data through any of a variety of known data encryption techniques. Oftentimes, particularly if the data is to be transmitted through a computer network, encryption techniques are coupled with data compression techniques to reduce bandwidth requirements during transmission. While the goal of cryptography is to ensure that an unauthorized individual cannot gain access to the underlying data which has been encrypted, it can also be beneficial to ascertain whether or not a given file contains encrypted information. This could be useful, for example, by investigators or individuals who simply desire confirmation that their files have been encrypted as intended. When a file is encrypted, the encryption scheme randomizes the data resulting in a conversion of the plaintext into cyphertext. This can make it exceedingly difficult for someone to decipher the underlying information if not privy to the encryption algorithm.

Figure 1A:
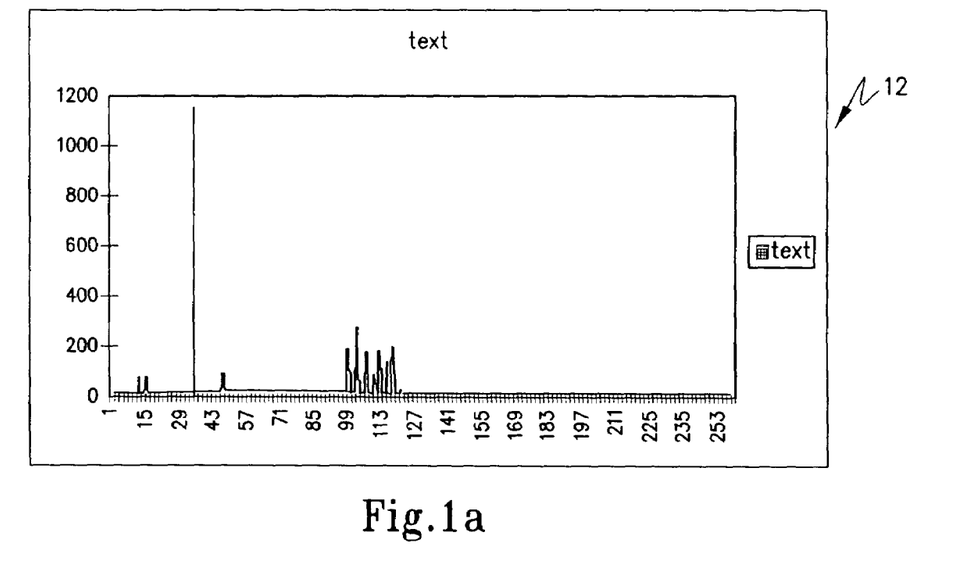
FIG. 1(a) illustrates a representative histogram for a non-encrypted text file.
Figure 1B:
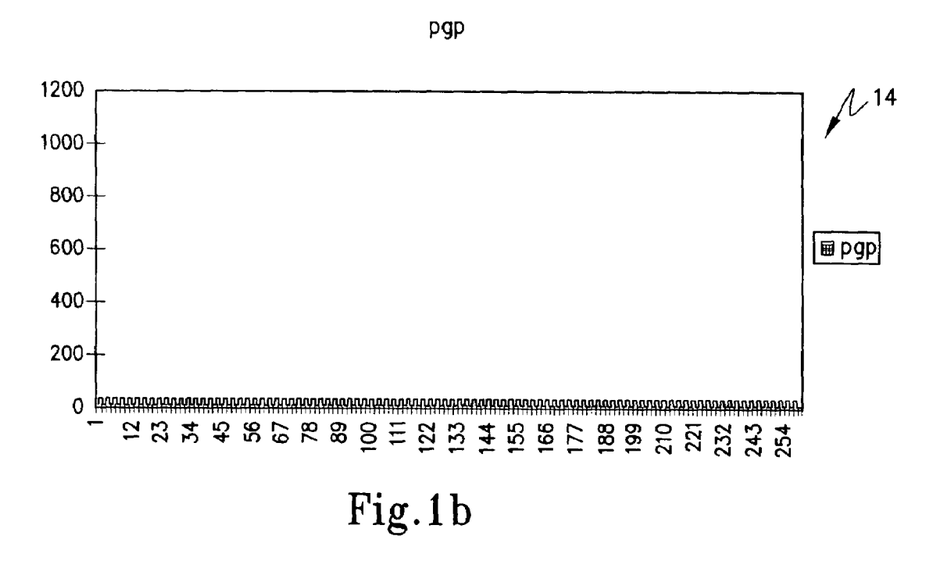
FIG. 1(b) illustrates a representative histogram for the representative text file of FIG. 1(a) after it has been encrypted.

To illustrate this randomization property, reference is initially made to FIGS. 1(a) and 1(b). FIG. 1(a) illustrates a histogram 2 of a non-encrypted file, such as a text file, where the x-axis represents the ASCII value corresponding to the various alphanumeric characters present in the file, and the y-axis illustrates the relative frequency of each of these alphanumeric characters. Since the non-encrypted file is a text file, it is not surprising that the most frequently occurring ASCII value is 32 which corresponds to the spacebar keystroke. In contrast, FIG. 1(b) illustrates a second histogram 12, having characteristics that one would expect after the same text file has been encrypted through an appropriate encryption scheme, such as PGP (Pretty Good Privacy). It can be seen that the histogram of FIG. 1(b) is much flatter because the encryption algorithm has randomized the data, such that the frequency distribution of the various characters is much more uniform after the file has been encrypted. It has been surprisingly found that the uniformity, or lack thereof (randomness), exhibited by the frequency distribution of byte values in a file (i.e. their histogram) is a characteristic which can be used to gain useful insight, and to actually make a determination within varying degrees of reliability, as to whether a given file has been encrypted. The present invention is particularly directed to making such assessments.

SUMMARY OF THE INVENTION

It is an object of the present invention to provide a computerized method for determining whether a stream of data, such as that associated with the data portion of a selected type of file, is in a cyphertext format.

Another object of the present invention is to provide such a computerized method which is particularly adapted to search a target set of directories within a hierarchical file system of an information processing device, such as a PC, to determine whether any files within each of the directories is in a cyphertext format.

It is yet another object of the present invention to provide a computer-readable medium having executable instructions for ascertaining an existence of data encryption within the data stream portions of one or more data files.

A further object of the present invention is to provide a computerized system for identifying an existence of cyphertext in a data stream.

In accordance with these objectives, the present invention in one sense relates to a computerized method for determining whether a data stream is in a cyphertext format. The data stream being analyzed is characterized by a plurality of data bytes each having an associated byte value. The computerized methodology of the present invention is particularly suitable for determining whether one or more files contain cyphertext, wherein each file includes a header portion corresponding to a selected file type and a data portion of a selected minimum size, such as 512 bytes, that includes the data stream. The computerized method broadly comprises performing a statistical analysis of the associated data stream's byte values to compute a statistical result having an resultant value indicative of a level of uniformity for a frequency distribution of the byte values throughout the data stream (i.e. a byte histogram), and controlling an output device to display output corresponding to an existence of cyphertext if the resultant value indicates uniformity of the frequency distribution.

Preferably, the statistical analysis involves computing an average byte value for the data stream, performing a chi-square statistical analysis of the data bytes within the data stream to compute a total chi-square value corresponding to a statistical difference of each byte's value from the average byte value. A resultant value is then computed based upon the total chi-square value, whereby this resultant value indicates a level of uniformity for the frequency distribution of the associated bytes throughout the data stream (i.e. the byte histogram). This resultant value may be compared to a predetermined threshold value, and the output indicative of data encryption can be generated upon a determination that the resultant value is less than the threshold value. However, an additional determination is also preferably made to ascertain if the file's header portion corresponds to a known file format, such as an image file or a compressed file, whereby output indicative of an existence of data encryption is only generated for the associated file if the resultant value is uniformity for the byte histogram and the file type is unrecognized.

In its exemplary embodiment, the computerized method searches a target set of directories within a hierarchical file system of a computational device, such as a PC, to determine whether any files within each directory is in a cyphertext format. In this exemplary embodiment, the methodology discussed above for ascertaining encryption of a single file is repeated sequentially with respect to each file in each directory associated with the target directory set. In addition, a tabulation may be maintained for the total number of files searched, the total number of files deemed to be too small to search, and the total number of each known file type encountered. Output may be displayed corresponding to these tabulation results.

The present invention also relates to a computer-readable medium having executable instructions for performing the computerized methodology discussed herein, as well as an encryption detection system for identifying an existence of cyphertext in a data stream. Such a system broadly comprises a storage device, an output device, and a processor which is programmed to perform the statistical analysis and control the output device. The system preferably also includes an input device for generating input data corresponding to a set of user-defined search preferences and/or output display preferences, with the processor being programmed to receive and process these input preferences.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention relates to detecting an existence of data encryption within a data stream, such as that associated with a selected type of file. The present invention is more suitably adapted to ascertaining an existence of data encryption by determining whether the associated data portions for each of a plurality of files within a target directory set is in a cyphertext format. To this end, the invention encompasses a computerized methodology, a computer-readable medium, as well as an encryption detection system for accomplishing these objectives. However, although the inventions is particularly described in the context of a file's data stream, it is also contemplated that the concepts taught herein can be extended to apply to data streams travel along a communications interface, such as a network interface card (NIC).

In its preferred form, the present invention is implemented on a user's computer system which typically includes an input device such as a keyboard, a display device such as a monitor, and a pointing device such as a mouse. The computer also typically comprises a random access memory (RAM), a read only memory (ROM) a central processing unit (CPU), and a storage device. The storage device may be a large-capacity permanent storage such as a hard disk drive, or a removable storage device, such as a floppy disk drive, a CD-ROM drive, a DVD-ROM drive, flash memory, a magnetic tape medium, or the like. However, the present invention should not be unduly limited as to the type of computer on which it runs, and it should be readily understood that the present invention indeed contemplates use in conjunction with any appropriate information processing device, such as a general-purpose PC, a PDA or the like. Moreover, the computer-readable medium which contains executable instructions for performing the methodology discussed herein can be a variety of different types of computer-readable media, such as the removable storage devices noted above, whereby that the user's application software can be stored in an executable form on the computer system.

The source code for the software was developed on a Windows machine utilizing a standard C compiler such as Visual C++, which includes its own compiler for converting the high level C programming language into machine code. However, the software program could be readily adapted for use with other types of operating systems, such as Unix or DOS, to name only a few, and it may be written in one of several widely available programming languages with the modules coded as sub-routines, sub-systems, or objects depending on the language chosen. In addition, various low-level languages or assembly languages could be used to provide the syntax for organizing the programming instructions so that they are executable in accordance with the description to follow. Thus, the preferred development tools utilized by the inventor should not be interpreted to limit the environment of the present invention. The software embodying the present invention may be distributed in known manners, such as on computer-readable medium or over an appropriate communications interface so that it can be installed on the user's computer system. Furthermore, alternate embodiments of the invention which implement the system in hardware, firmware or a combination of both hardware and software, as well as distributing the modules and/or the data in a different fashion will be apparent to those skilled in the art. It should, thus, be understood that the description to follow is intended to be illustrative and not restrictive, and that many other embodiments will be apparent to those of skill in the art upon reviewing the description.

In the following detailed description, reference is made to the accompanying drawings which form a part hereof, and in which is shown by way of illustrations specific embodiments for practicing the invention. The leading digit(s) of the reference numbers in the figures usually correlate to the figure number, with the exception that identical components which appear in multiple figures are identified by the same reference numbers. The embodiments illustrated by the figures are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined only by the appended claims.

Figure 2:
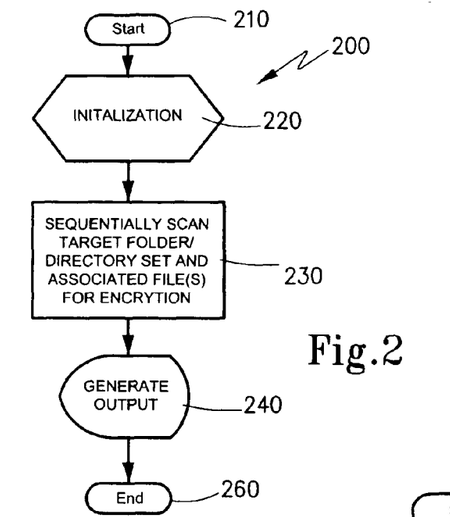
FIG. 2 represents a high level flowchart for computer software which implements the functions of the encryption detection system of the present invention.

With the above in mind, reference is now made to FIG. 2 which is a high level flowchart which broadly summarizes one embodiment of software 200 for implementing the functions of the encryption detection system of the present invention. Following start 210, the software performs an initialization routine 220 to check for memory allocation and the appropriateness of user input for the file search and output display parameters. The software proceeds at block 230 to sequentially scan for encryption the particular files within associated directories that are identified. It should be appreciated that, while the particular embodiment of the invention described herein scans for encryption a target set of directories within a hierarchical file system and their associated files, this is in no way intended to be a limitation on the scope of the invention. That is, the user could particularly identify a precise group of files within one or more target directories, without requiring that all files within each identified directory be scanned. The ability to do so is particularly facilitated in a Windows environment by virtue of the file selection and manipulation capabilities provided therein. In addition, throughout the description herein, the terms "target set of directories" and "target directory set" are some times used interchangeably, and the specific term "set" should be construed as broadly as possible to include a selection of either one or a plurality of items, so that any type of set is contemplated other than a null set. As such, "target set of directories" as used in the description and the claims can mean either plurality of directories or a single directory, based on the users selection criteria. In addition, the terms "directory" and "folder", as well as "sub-directory" and "sub-folder" are also used interchangeably throughout the description, figures and claims, but should not construed as limiting the context of the present invention to a particular operating system environment. In any event, once block 230 in FIG. 2 has been executed, appropriate output is generated at block 240 whereby the search results for the data encryption are displayed according to the user's preferences, if desired, after which software methodology 200 ends at 260.

Figure 3A:
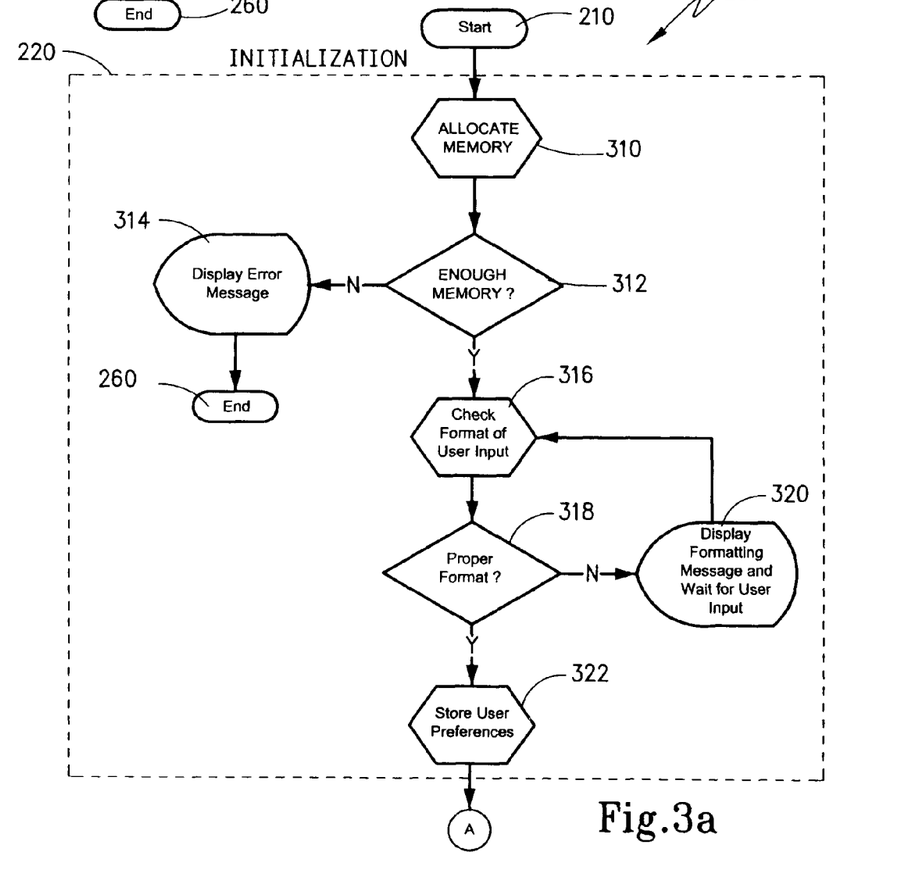
FIGS. 3(a)-3(b), collectively, represent a more detailed high level flowchart for computer software which implements the encryption detection system of the present invention.
Figure 3B:
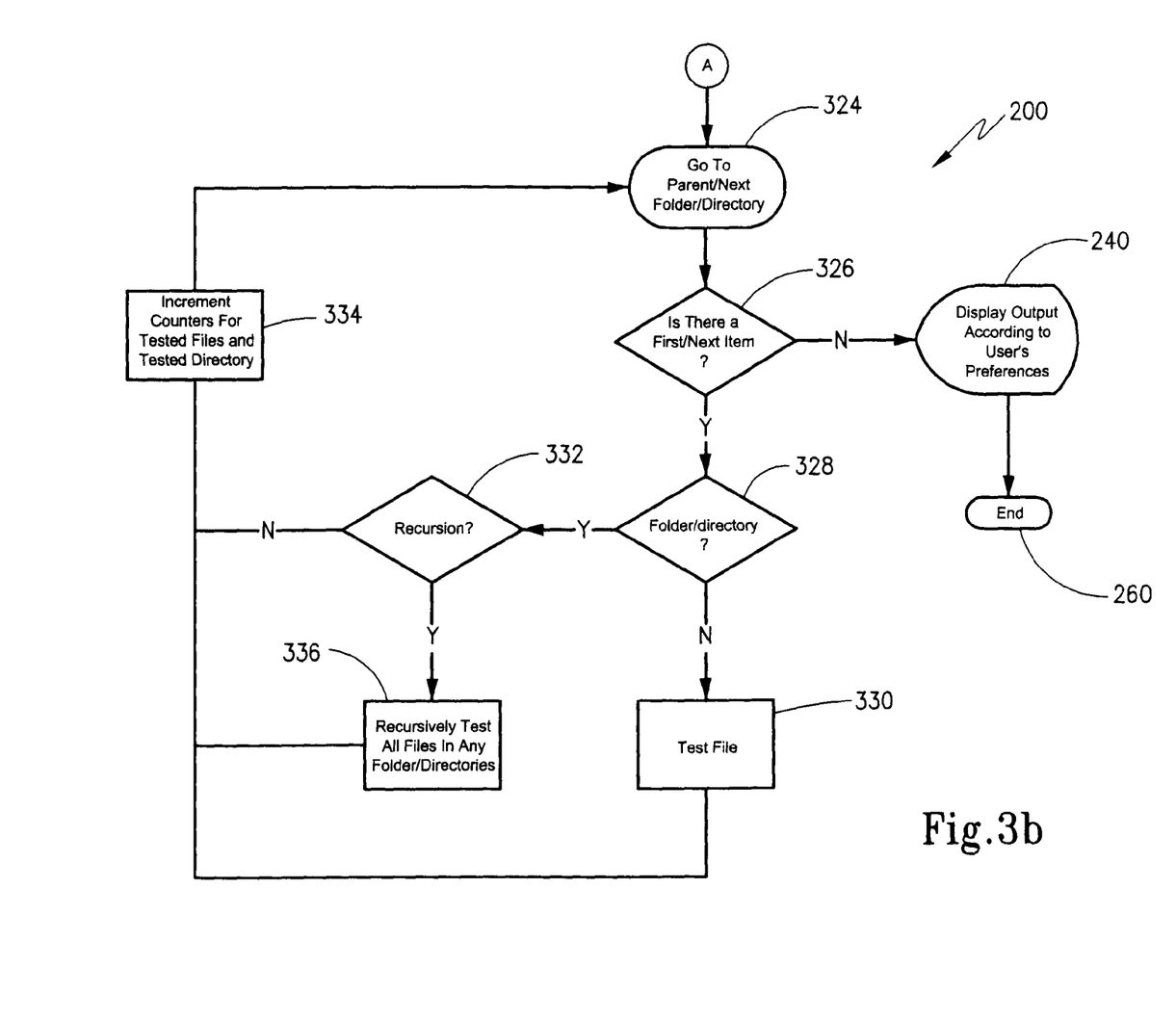

A more detailed high level flowchart for these general processing steps in FIG. 2 can be appreciated with reference now to FIGS. 3(a) & 3(b). During initialization 220, the software initially tries to allocate sufficient memory, such as 1 megabyte, within the computer system at block 310 for running the program. If the inquiry at 312 results in a finding that there are not sufficient memory reserve, then an error message is displayed at block 314 and the program ends at 260. However, assuming there is sufficient memory, the software proceeds at block 314 to check the format of the input data provided by the user corresponding to searching parameters, and parameters for displaying output results. For example, when the present invention is implemented in a DOS environment, the user might provide command line input in the following format:

C:\[program.exe]-r-s-v [pathname]

In the above representative command line format, "pathname" identifies a target directory, the contents of which the user desires to be searched for an existence of data encryption. The notation "-r" indicates a preference that the directory be recursively searched so that all files within each sub-directory are also searched. If the user does not desire to have the contents of sub-directories searched, then the notation "-r" would be omitted. The notation "-s" simply indicates the user's preference to have a listing displayed in the results to identify those files within the target directory that are deemed too small to be searched. Finally "-v" is another option the user can provide in the command line if it is desirable to obtain the resultant statistical value calculated by the program corresponding to a level of uniformity of a frequency distribution for the data bytes throughout the data stream of each file searched. In any event, if the software determines at 318 that the input data is not in a proper format, then an appropriate formatting message is displayed to the user at 320 and the program awaits proper input from the user so that it can proceed again 316 to check the input format. Otherwise, the software proceeds at 322 to store the user's preferences.

At this point, the software at 324 in FIG. 3(b) proceeds to the target directory identified in the pathname, which may be either the root directory or any other sub-directory, and determines at 326 whether there are any contents within this parent directory, namely either a file(s) or a sub-directory. If, for some reason, the user has identified a directory for which there are no contents, then the software displays appropriate output at 240 and ends at 260. Assuming, however, that the parent directory does have contents, the software then proceeds to sequentially search the contents of the parent directory according to the user's desired preferences. That is, if the user does not desire for sub-folders within the parent directory to be searched, then the software will simply sequentially check each of the files within the parent directory. Alternatively, if the user does desire for sub-folders to be searched, then the software will sequentially proceeds through each of the contents in the parent directory. As it encounters files, it will search each of these files for encryption. However, if the program encounters one or more sub-directories, it will then recursively check the contents of these sub-directories in the same manner as it does with the parent directory.

To illustrate this in greater detail, if the first item in the parent directory is not another folder (i.e., it is a file) then the response to inquiry 328 is in the negative and software proceeds to function block 330 to test the encountered file for encryption. However, if either the first or any subsequent item in the parent directory is a sub-directory, then the flow of the program is dictated by whether or not the user desires for sub-directories to be recursively checked for encryption. If not, then the software proceeds in response to inquiry 332 to block 334 where it increments counters for the total number of files and directories encountered, and then returns to the parent directory at 324. If, on the other hand, the user does wish for sub-directories to be recursively checked (i.e. the user has input "-r" at the command line prompt), then the software proceeds at 336 to recursively test all files in each directory or sub-directory that is encountered.

Figure 4:
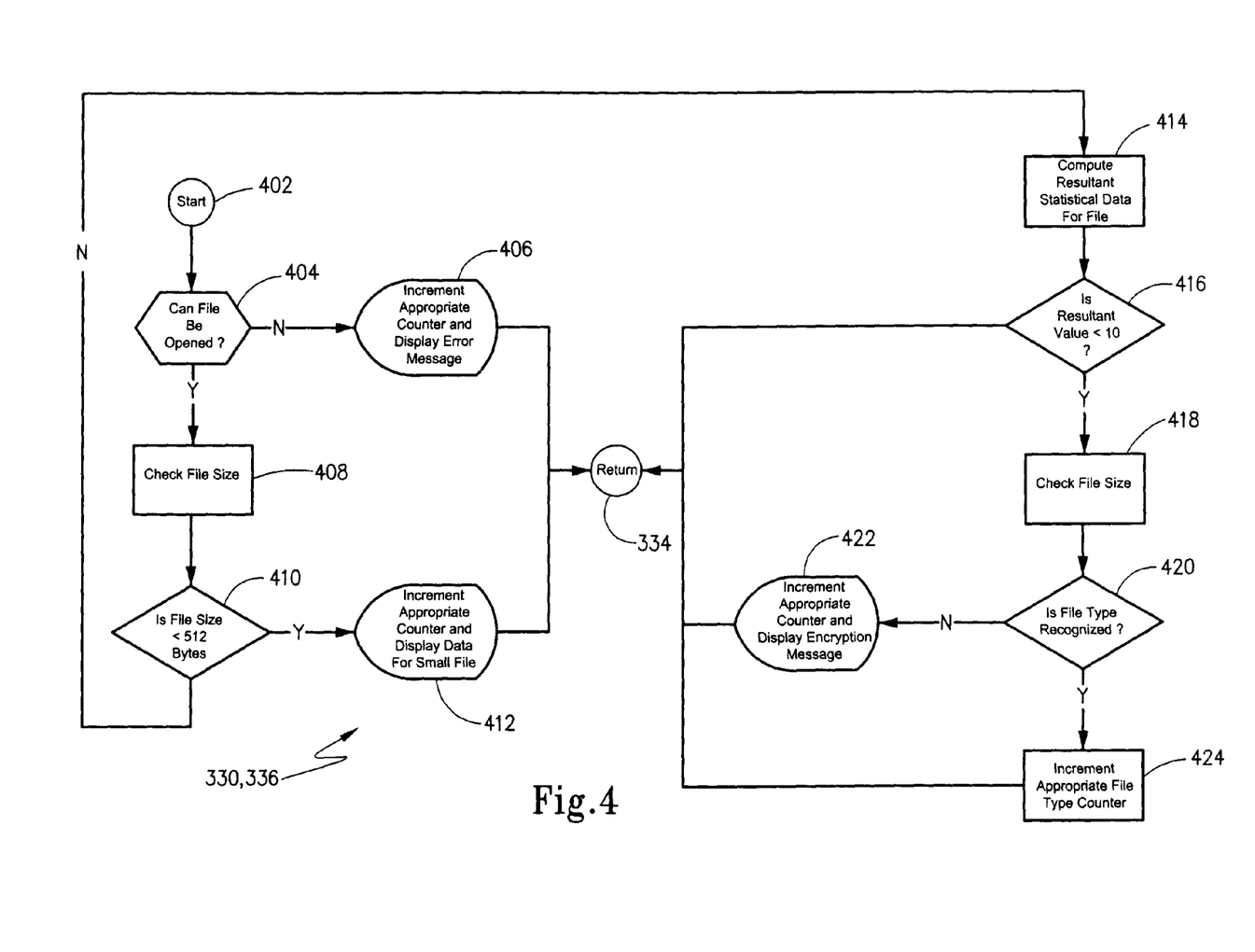
FIG. 4 is a detailed flowchart for the test file sub-routine of FIG. 3(b)

With the above in mind, reference is now made to FIG. 4 which is a high level flowchart for the encryption detection test procedure for each targeted file which is encountered, either via block 330 or block 336 in FIG. 3(b). When this routine is called at 402, the software initially attempts to open the file at 404. If the file cannot be opened, an appropriate error message is displayed at 406 and the software returns to increment appropriate counters at block 334 in FIG. 3(b) and then proceeds to the associated parent directory at block 324 to continue the looping procedure. However, assuming that the file can be opened, its size is checked at 408. If it is found at 410 the file size is at least 512 bytes then the software will proceed to perform a statistical analysis of the file contents. If not, then an appropriate counter is incremented and a message is displayed to the user at 412 to identify the size of and name such file. The program then returns to block 334 in FIG. 3(*b*). It should be appreciated that the selection of 512 bytes as a minimum size threshold can be adjusted for one's particular preferences and the degree or reliability desired for the encryption test results.

Where the selected size threshold is met, statistical data for the file is computed at block 414. Preferably, this involves analyzing the stream of bytes within the data portion of the file to compute a chi-square (abbreviated herein as "Chi2") statistical value for each byte. Chi2 is a known algorithm for testing statistical significance of observed data. The D statistic algorithm is another known test which could also be employed by the software of the present invention, but is believed that the Chi2 statistical analysis generates more reliable results. As known, the Chi2 formula can be expressed as:

$$((O-E)^2 \backslash E)$$

When this formula is specifically directed to a stream of bytes comprising the data portion of a given file, the variable "O" in the above formula corresponds to a particular value (such as the decimal equivalent) for each associated byte in the data stream, while the expected frequency "E" in the formula above corresponds to an average byte value in decimal form for the data stream portion. Accordingly, this formula is applied sequentially to each byte within the data portion of the particular file, and these individual calculations for each byte within a given file are then summed to provide a total chi-square value (abbreviated "TChi2") for the file's data portion. Although not necessary, it is preferred to only compute a TChi2 value for the data portion of the file, and not its header portion which identifies the file type, since results are more reliable if header bytes are ignored. To accomplish this, the software assigns a pointer to the beginning of the file's data portion and, as the bytes are sequentially read, their corresponding values are stored in a memory buffer. Further, as each byte is read, a byte counter is incremented so that average byte value for the data stream can be calculated. The byte values are then totaled to arrive at TChi2. Once the TChi2 for the data stream has been computed, a resultant statistical value is obtained from the according to the formula:

$$R = SQRT(2.0 \times TCHI2) - SQRT(2.0 \times ByteCount-5)$$

This formula gives a resultant statistical value which is representative of the byte histogram for the data portion of the file, and particularly gives a numerical indication of the relative uniformity of the distribution of the bytes throughout the file stream. The subtraction of the integer 5 is to account for the number of bytes in the header portion so that their contribution is ignored. It should be appreciated, however, that utilization of this formula, while desirable, is also not a necessity and any appropriate statistical calculation of the bytes could be used to arrive at a statistical resultant value which is indicative of the byte histogram's degree of uniformity.

Once the resultant value "R" is computed, the software makes a determination at inquiry 416 in FIG. 4 as to whether the resultant value is less than 10, which is a threshold value that the inventor has determined to be a reliable indicator for the degree of uniformity for the frequency distribution of the bytes across the file. That is, if the resultant value is greater than 10 then this indicates that the histogram for the file is random, such as in the representative histogram discussed above with reference to FIG. 1(*a*). The conclusion, then, is that the file does not contain cyphertext data (i.e. is not encrypted). In such a case, the software returns to block 334 in FIG. 3(*b*).

If, however, the computed resultant value is less than 10, this provides a preliminary indication of encryption, but the software preferably proceeds at block 418 in FIG. 4 to further check the file's header portion to see if it corresponds to a known file type/format, or any of the various implementations of the specifications for them. Specifically, the software checks to see whether the file header identifies the file as either a compressed data file (such as ZIP, ARC, or the like) or an image file (such as JIF, JPEG, BMP, PCX, DCX, sound file, or the like). It has been determined that when the statistical analysis above is computed for either compressed or image files, the resultant value computed indicates randomness for the byte histogram, irrespective of whether the particular file has actually been encrypted or not. This is due to the nature of compression for such files. That is, when a file is compressed, predictability is removed, and what remains is randomness. Accordingly, it becomes desirable to additionally read the header portion of such files to see if they are recognized since an image file or a compressed file which has not been encrypted would have an identifiable header portion according to known file formats as identified in the image specification documents for each format, whereas encrypted versions of such files would have unrecognizable headers.

Thus, if the software at inquiry 420 is unable to recognize the file type then the program concludes that the file has been encrypted, increments an encryption counter, and displays an appropriate encryption message at 442. If, however, the file type is recognized, albeit the statistical resultant value is less than 10, then the software increments an appropriate counter for the file type at 424 and simply returns to block 334 in FIG. 3(*b*).

Figure 5:
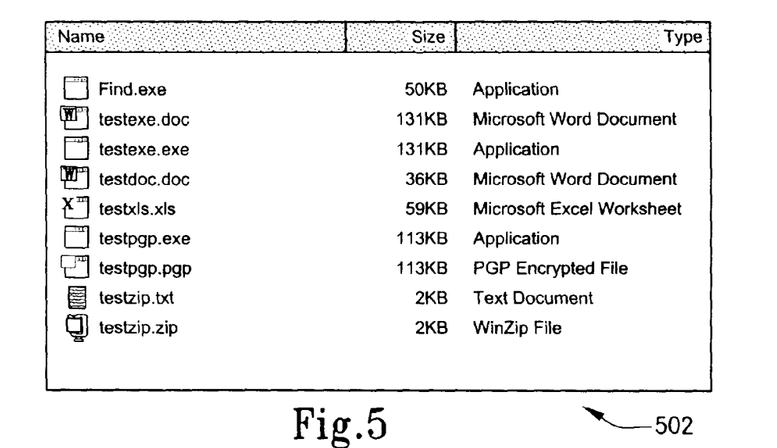
FIG. 5 illustrates the contents of another representative target directory, the associated files of which can be selectively analyzed for data encryption according to the concepts of the present invention.
Figure 6A:
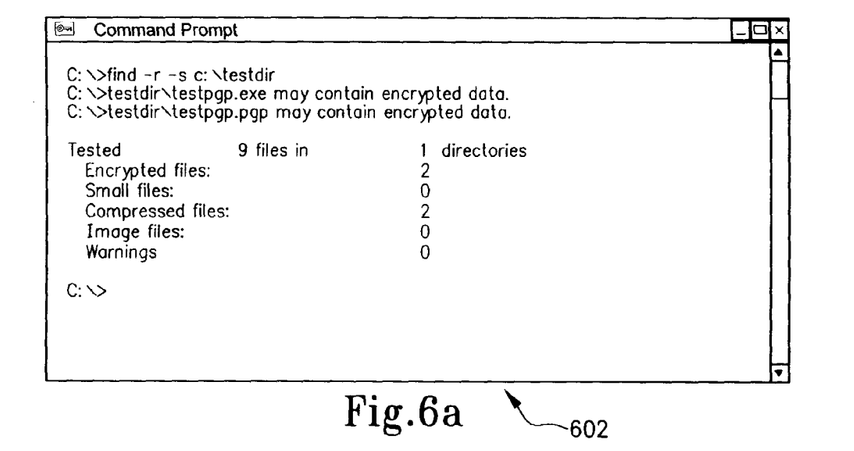
FIG. 6(a) shows representative output which can be generated according to one set of user-defined parameters for the target directory of FIG. 5.
Figure 6B:
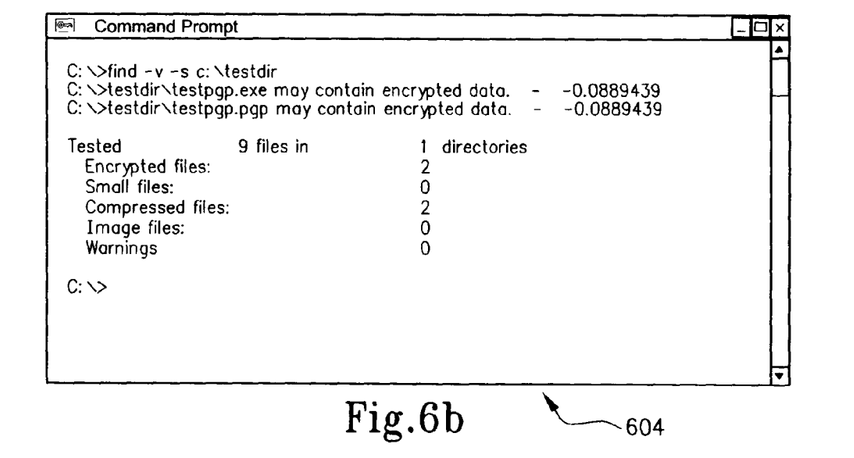
FIG. 6(b) shows representative output which can be generated according to another set of user-defined parameters for the target directory in FIG. 5.

With the above description in mind, reference is now made to the remaining figures to illustrate representative examples of the software program in use. A first such representative example is shown in FIGS. 5, 6(*a*) & 6(*b*). In FIG. 5, a listing 502 of files is shown which might correspond to selected files for testing within a target directory, referred to herein as "testdir". This file listing 502 is provided to illustrate the versatility of the software program at ascertaining encryption regardless of the particular extension assigned to a given file. There are some programs on the marketplace which look only to the file extension and use that to determine the file type. This technique is considered weak and can easily be circumvented simply by changing the name of the extension.

For purposes of explanation, it is the actual file name in the above listing which corresponds to the file type, as opposed to the extension. So, for example, while the operating system might interpret "testzip.txt" as a text document, it is in fact a zip file. Similarly, "testexe.doc" is an executable application file, as opposed to a Microsoft Word document. Accordingly, it can be seen for example that, among other files, there are two encrypted files and two compressed zip files in listing 502. The extensions for some of these files, however, have been changed to illustrate that the program is smart enough to nonetheless detect encryption. A first type of output 504 can be displayed, as shown in FIG. 6(*a*), for the file listing 502 in FIG. 5. As can be seen in FIG. 6(*a*), the user's input at the command line prompt indicates a preference that the directory containing the file listing 502, namely "testdir", be recursively checked and that any files deemed to be too small also be listed. As can be seen from its output, the program properly tabulates that all nine files within the one directory have been checked and that, of these nine files, two are deemed to be encrypted and two are determined to be compressed files. The two encrypted files are properly listed as "testpgp.exe" and "testpgp.pgp".

A second type of output 506 is shown in FIG. 6(b). Here, since "-v" has been provided by the user in the command line, the program additionally provides the resultant value that was computed for each of the encrypted files. Note also that, even though the command line prompt does not include a preference that "testdir" be recursively checked, the total number of files and directories scanned is no different than that shown in FIG. 6(a) since there are no sub-directories in "testdir".

Figures 7A, 7B:
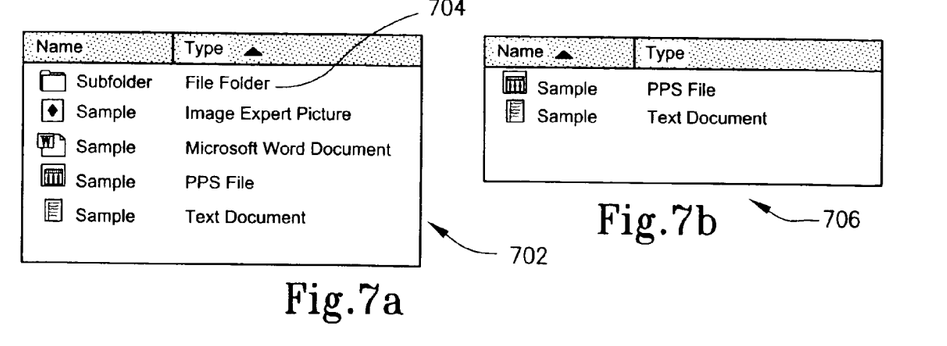
FIG. 7(a) illustrates the contents within a representative target directory, the associated files of which can be selectively analyzed for data encryption according to the concepts of the present invention.
FIG. 7(b) shows the contents within the sub-directory of FIG. 7(a), the associated files of which may also be selectively analyzed for an existence of data encryption if desired.
Figure 8A:
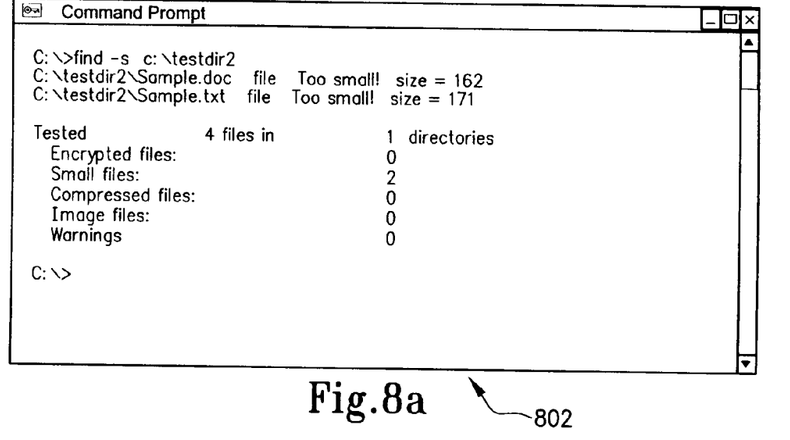
FIG. 8(a) shows representative output which can be displayed when only those files within the target directory of FIG. 7(a) are analyzed for existence of data encryption.
Figure 8B:
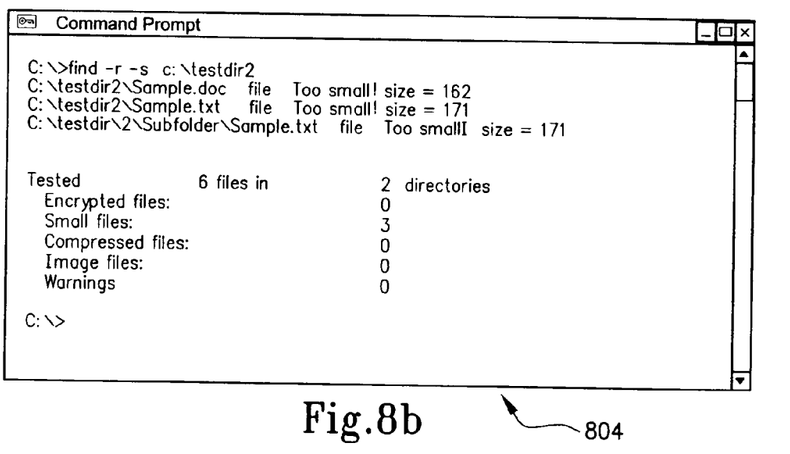
FIG. 8(b) shows representative output which can be displayed when the target set of directories comprises both the parent directory of FIG. 4(a), as well as its associated sub-directory of FIG. 8(b)

A second illustrative example of the software program in use may now be appreciated with reference to FIGS. 7(a)-7(b) & 8(a)-8(b). In FIG. 7(a) a file listing 702 is shown for a selected parent folder which, here, includes a sub-folder 704. FIG. 7(b) shows the contents 706 for sub-folder 704. In FIGS. 7(a) and 7(b), the file types listed in the right hand columns are, in fact, accurate. Accordingly, this second example is provided to show how the program can recursively check sub-folders if desired, and is also provided to illustrate that encryption detection can proceed properly even if no extension is provided in the file name. With this in mind, reference is made to FIG. 8(a) which illustrates output that can be displayed if only the parent directory, referred to as "testdir2" is checked. It can be seen in this figure that the command line input corresponds to the user's desire for the program to indicate those files which are deemed to be too small to check, but does not indicate a desire for "testdir2" to be recursively checked. Accordingly, it can be seen that the output 802 which is displayed indicates that all four files within the one parent directory "testdir2" were checked for encryption. Of these, no encrypted files were found, but two files were deemed to be too small. Finally, a second type of output 804 is shown in FIG. 8(b) which, as may be seen, corresponds to the user's additional desire to have "testdir2" recursively checked. In this case, the output indicates that two directories were checked, namely the parent directory and its sub-directory, resulting in a total of six files being checked. In this case, encryption was not found, but three such files were deemed to be too small.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A computerized method for determining whether a data stream is in a cyphertext format, wherein said data stream is characterized by a plurality of data bytes, each having an associated byte value, said method comprising:
performing a statistical analysis of the associated data stream's byte values to compute a statistical result having a resultant value indicative of a level of uniformity for a frequency distribution of the byte values in the data stream;
comparing the resultant value to a threshold;
determining whether a header portion of the file corresponds to a known file type based on the comparison; and
controlling an output device to display an output corresponding to an existence of cyphertext based on the resultant value indicating non-uniformity of the frequency distribution and the determination of the header portion,
wherein the output includes a tabulation of a total number of files searched, a total number of files deemed to be too small to search, and a total number of each predetermined format encountered.

2. The computerized method according to claim 1 wherein said data stream is part of a file on a data storage medium.

3. The computerized method according to claim 2 wherein said file includes the header portion and a data portion which includes said data stream.

4. The computerized method according to claim 3 further comprising reading the header portion of the file and displaying an output corresponding to an existence of cyphertext if both the resultant value indicates non-uniformity and the header portion is uncorrelated to a known file type.

5. The computerized method according to claim 4 wherein said known file type is one of an image file format and a compressed file format.

6. The computerized method according to claim 1, wherein said statistical analysis is only performed if the data stream has at least a minimum stream size.

7. The computerized method according to claim 6 wherein said minimum stream size is 256 bytes.

8. The computerized method according to claim 1 wherein said statistical analysis involves computing an average byte value for the data stream, performing a chi-square statistical analysis of the data bytes to compute a total chi-square value corresponding to a difference of each byte's value from the average byte value, and computing said resultant value based upon the total chi-square value.

9. A computer-readable medium having executable instructions for performing a method comprising:
reading a data stream and header portion associated with each of a plurality of files, each said data stream portion characterized by a plurality of data bytes, each having an associated byte value;
computing a resultant value that is indicative of a level of uniformity for a frequency distribution of associated byte values throughout the data stream portion;
comparing the resultant value to a threshold;
determining whether a header portion of the file corresponds to a known file type based on the comparison; and
controlling an output device to display an output corresponding to an existence of data encryption based on the resultant value indicating non-uniformity of the frequency distribution and the determination of the header portion,
wherein the output includes a tabulation of a total number of files searched, a total number of files deemed to be too small to search, and a total number of each predetermined format encountered.

10. The computer-readable medium according to claim 9 wherein said executable instructions perform a statistical analysis of the data stream portion of each of the files.

11. The computer-readable medium according to claim 9 wherein each of said files includes the header portion and said data stream portion, said executable instructions only analyzing said data stream portion.

12. The computer-readable medium according to claim 10 wherein said executable instructions only perform said statistical analysis if the data stream portion has a stream size of at least 256 bytes.

13. The computer-readable medium according to claim 12 further comprising displaying an output corresponding to an existence of cyphertext if the header portion is uncorrelated to a known file type.

14. The computer-readable medium according to claim 13 wherein if the header portion corresponds to a known value, the data stream corresponds to a known file type relating to one of an image file format or a compressed file format.

15. The computer-readable medium according to claim 10 wherein said statistical analysis involves computing an average byte value for the data stream portion, performing a chi-square statistical analysis of the data bytes to compute a chi-square value corresponding to a statistical difference of each byte's value from the average byte value, and computing said resultant value based upon the chi-square value.

16. A computerized method for determining whether a selected file contains cyphertext, wherein the selected file includes a header portion corresponding to a file type and a data portion that includes a data stream characterized by a plurality of data bytes, each having an associated byte value, said computerized method comprising:
   computing an average byte value for the data stream;
   performing a chi-square statistical analysis of the data bytes to compute a total chi-square value corresponding to a statistical difference of each byte's value from the average byte value;
   computing a resultant value based upon the chi-square value, whereby said resultant value indicates a level of uniformity for a frequency distribution of the associated byte values throughout the data stream;
   comparing said resultant value to a predetermined threshold value;
   determining whether the header portion of the file corresponds to a known file type based on the comparison; and
   generating an output indicative of data encryption upon a determination that the threshold value exceeds the resultant value and the determination of the header portion,
   wherein the output includes a tabulation of a total number of files searched, a total number of files deemed to be too small to search, and a total number of each predetermined format encountered.

17. The computerized method according to claim 16 wherein said chi-square statistical analysis is performed when the data stream is at least a minimum stream size and wherein said output is displayed when the header portion fails to correspond to a known file type.

18. The computerized method according to claim 17 wherein said minimum stream size is 256 bytes.

19. The computerized method according to claim 17 wherein said known file type is selected one of an image file format and a compressed file format.

20. A computerized method for searching a type of media to determine whether any data file stored therein is in a cyphertext format, wherein each of said data files includes a header portion and a data portion that includes a data stream characterized by a plurality of data bytes, each having an associated byte value, said computerized methodology comprising, sequentially with respect to each of said files:
   computing an average byte value for the data stream;
   performing a statistical analysis of the data bytes to compute a statistical value corresponding to a statistical difference of each byte's value from the average byte value;
   computing a resultant value based upon the statistical value, whereby said resultant value indicates a level of uniformity for a frequency distribution of the associated byte values throughout the data stream;
   comparing said resultant value to a predetermined threshold value; and
   maintaining a tabulation of a total number of files searched, a total number of files deemed to be too small to search and a total number of each determined format encountered;
   wherein in the comparing step includes generating one of:
      first output indicative of data non-encryption if said resultant value is less than the threshold value; and
      second output indicative of data encryption if said threshold value exceeds the resultant value and said header portion fails to correspond to a predetermined format.

21. The computerized method according to claim 20 whereby said statistical analysis is only performed if the data stream is at least a minimum stream size.

22. The computerized method according to claim 20 further comprising displaying output corresponding to said tabulation.

23. An encryption detection system for identifying an existence of cyphertext in a data stream that is characterized by a plurality of data bytes each having an associated byte value, said system comprising:
   a storage device;
   an output device; and
   a processor programmed to:
   perform a statistical analysis of the data stream's associated byte values to compute a statistical result having a resultant value indicative of a level of uniformity for a frequency distribution of the associated byte values throughout the data stream;
   compare the resultant value to a threshold; and
   control an output device to display an output corresponding to an existence of cyphertext and a determination of whether a header portion of the data stream corresponds to a known file type based on the comparison,
   wherein the output includes a tabulation of a total number of files searched, a total number of files deemed to be too small to search, and a total number of each predetermined format encountered.

24. The encryption detection system according to claim 23 including an input device for generating input data corresponding to a location of the data stream.

25. An encryption detection system for identifying an existence of cyphertext in respective data streams, wherein each of said data streams is characterized by a plurality of data bytes each having an associated byte value, said system comprising:
   storage means;
   output means; and
   processing means for:
   performing a statistical analysis of each data stream's associated byte values to compute a statistical result having a resultant value indicative of a level of uniformity for a frequency distribution of the associated byte values throughout the data stream; and
   controlling an output device to display output corresponding to an existence of cyphertext based on the resultant value indicating non-uniformity of the frequency distribution and a determination of whether a header portion of the data stream corresponds to a known file type, maintaining a tabulation of a total number of files searched, a total number of files deemed to be too small to search, and a total number of each predetermined format encountered.

26. The encryption detection system according to claim 25 including an input device for generating input data corresponding to a location of the data stream.

27. The computerized method according to claim 20, wherein the header portion fails to correspond to a predetermined format.

* * * * *